United States Patent
Miyazaki

(10) Patent No.: US 8,710,816 B2
(45) Date of Patent: Apr. 29, 2014

(54) BUCK CONVERTER HAVING REDUCED RIPPLE UNDER A LIGHT LOAD

(75) Inventor: Takahiro Miyazaki, Oita-ken (JP)

(73) Assignee: Texas Instruments Incorporated, Dallas, TX (US)

(*) Notice: Subject to any disclaimer, the term of this patent is extended or adjusted under 35 U.S.C. 154(b) by 540 days.

(21) Appl. No.: 12/816,665

(22) Filed: Jun. 16, 2010

(65) Prior Publication Data

US 2010/0315055 A1 Dec. 16, 2010

(30) Foreign Application Priority Data

Jun. 16, 2009 (JP) ................. 2009-143559

(51) Int. Cl.
*G05F 1/00* (2006.01)

(52) U.S. Cl.
USPC ........................................ 323/284

(58) Field of Classification Search
USPC ......... 323/234, 282–285, 237, 265, 266, 273, 323/274
See application file for complete search history.

(56) References Cited

U.S. PATENT DOCUMENTS

| 6,924,633 | B2 | 8/2005 | Sanzo et al. | |
|---|---|---|---|---|
| 7,180,274 | B2* | 2/2007 | Chen et al. | 323/222 |
| 7,768,245 | B1* | 8/2010 | De Cremoux | 323/259 |
| 2006/0164057 | A1* | 7/2006 | Kudo et al. | 323/282 |
| 2008/0012540 | A1* | 1/2008 | Chen | 323/224 |
| 2008/0309390 | A1* | 12/2008 | Sahu | 327/170 |
| 2009/0128111 | A1* | 5/2009 | Chang Chien | 323/282 |
| 2011/0316503 | A1* | 12/2011 | Huang | 323/271 |

* cited by examiner

*Primary Examiner* — Matthew Nguyen
*Assistant Examiner* — Jeffrey Gblende
(74) *Attorney, Agent, or Firm* — William B. Kempler; Wade J. Brady, III; Frederick J. Telecky, Jr.

(57) ABSTRACT

A buck converter and a switching regulator capable of suppressing a ripple voltage under light load conditions. The buck converter has NMOS transistors QN2 and QN3 that are connected in series between input voltage VIN and the ground, inductor L1 that is connected to node SW where transistors QN2 and QN3 are connected, comparator COMP2 that compares respective voltages of node N1 and node N2 so as to decide on time of transistor QN2, and current detection circuit 100 that detects reverse current Ig flowing to the ground from inductor L1 via node SW and transistor QN3. When current detection circuit 100 detects reverse current Ig, voltage of node N1 of comparator COMP2 is reduced by variable circuit 110 in order to reduce the on time of transistor QN2.

20 Claims, 6 Drawing Sheets

BUCK CONVERTER HAVING REDUCED RIPPLE UNDER A LIGHT LOAD

This patent application claims priority from Japanese Patent Application No. 2009-143559, filed Jun. 16, 2009, which is incorporated herein by reference in its entirety.

FIELD OF THE INVENTION

The present invention pertains to a buck converter. In particular, it pertains to a circuit for suppressing an output ripple under a light load.

BACKGROUND OF THE INVENTION

As semiconductor devices used for portable telephones and in-vehicle electronic equipment become smaller and require less power, their operating voltages are reduced progressively. Typically, a DC/DC buck converter utilizes a transistor, which is switched by means of PWM control, to supply power to an inductor in order to generate an output voltage that is lower than the input voltage. This kind of buck converter is widely utilized for a switching power supply. For example, U.S. Pat. No. 6,924,633 discloses a PWM controller capable of operating at a high speed.

FIG. 1 is a switching regulator circuit diagram utilizing a conventional buck converter, and FIG. 2 is a timing chart of the circuit shown in FIG. 1. In FIG. 1, output voltage VO is divided at resistors R1 and R2 and input to the negative terminal of PWM comparator COMP1 as feedback voltage VFB. Reference voltage Ref is applied to the positive terminal of PWM comparator COMP1.

Output voltage VO is divided at resistors R3 and R4, and the divided voltage of node N1 is input to the positive terminal of $T_{ON}$ comparator COMP2; and node N2, which connects resistor R5 to capacitor C1, is applied to its negative terminal. Resistor R5 is connected to input voltage VIN. One end of capacitor C1 is connected to node N2, and the other end is connected to GND. Drain and source of NMOS transistor QN1 are connected to either end of capacitor C1 in parallel to said capacitor.

Output of $T_{ON}$ comparator COMP2 is connected to the reset input of flip-flop circuit FF. Output of PWM comparator COMP1 forms node N4, and node N4 is connected via an inverter to flip-flop circuit FF provided in the subsequent stage. Output of flip-flop circuit FF is connected to the gate of NMOS transistor QN1 via an inverter. Output node N5 of flip-flop circuit FF is connected to output buffer BF1 also. Output node N7 of output buffer BF1 is connected to the gate of NMOS transistor QN2. Drain of transistor QN2 is input terminal VIN, and source of NMOS transistor QN2 is connected to node SW. Node VBST is used for bootstrap. Node SW is connected to inductor L1, and capacitor CO1 constitutes a smoothing filter in conjunction with inductor L1. Output of inductor L1 is connected to output voltage VO, which becomes the output of the switching regulator. Positive terminal of comparator COMP3 is connected to node SW, and its negative terminal is set to a voltage closed to the GND side node voltage of NMOS transistor QN3. Here, D represents a delay element, and BF2 represents an output buffer.

Next, operations of the circuit shown in FIG. 1 will be explained. When feedback voltage VFB input to the negative terminal of PWM comparator COMP1 becomes lower than reference voltage Ref (time t1 in FIG. 2), node N4 as the output of comparator COMP1 is inverted to H level, flip-flop circuit FF of the subsequent stage is set, transistor QN1 constituting a $T_{ON}$ timer is turned off in the meantime, and a timer of $T_{ON}$ comparator COMP2 is started.

In the case of resistor R5 and capacitor C1 that are connected to the negative terminal of $T_{ON}$ comparator COMP2, because resistor R5 and capacitor C1 are connected in series between input voltage VIN and the ground potential, node N2 begins to increase gradually from the GND voltage to generate a $T_{ON}$ time until time t2 when it reaches the positive input voltage of $T_{ON}$ comparator COMP2. The $T_{ON}$ time is inversely proportional to input voltage VIN and proportional to output voltage VO. Once the $T_{ON}$ time is reached, that is, when time t2 is reached, node N3, which forms the output of $T_{ON}$ comparator COMP2, is inverted to L level; flip-flop circuit FF connected to node N3 is reset; node N6 becomes H level; transistor QN1 is turned on; the potential of node N2 drops; and the $T_{ON}$ time ends here.

A $T_{ON}$ time is generated at output node N5 of flip-flop circuit FF, it is supplied to output buffer BF1, and transistor QN2 is switched by its output node N7, whereby the $T_{ON}$ time is reflected on node SW. $T_{ON} \propto $ VO/VIN holds for the $T_{ON}$ time.

In the case of the buck switching power supply shown in FIG. 1, power supply conversion efficiency during a standby has been emphasized recently. Reduction of the oscillating frequency of the switching power supply is effective when the efficiency under a light load is to be improved. In addition, in the event of a light load when using a synchronous rectification system, a DCM (Discontinuous Current Mode) system is used to bring output node N8 of output buffer BF2 to L level based on the output of comparator COMP3 so as to turn off low side (Low side) transistor QN3 in order to improve the efficiency under a light load.

However, although the efficiency under a light load can be improved by reducing the oscillating frequency by turning the low side transistor QN3 off, it creates a problem that a ripple voltage reflected upon output voltage VO ends up increased.

Next, the ripple voltage under a light load will be explained. Here, voltage waveforms of on time of transistor QN2, output voltage VO, and feedback voltage VFB are shown in FIG. 3. On time of an ordinary buck switching regulator is decided based on input voltage VIN and output voltage VO, and the on time is expressed by Formulas 1 and 2. Here, cycle is denoted as T, on duty (On duty) is denoted as D, and on time is denoted as $T_{ON}$.

[Formula 1]

$$D = VO/VIN \qquad 1$$

[Formula 2]

$$T_{ON} = T \times VO/VIN = T \times D \qquad 2$$

Peak current that flows in inductor L1 during the $T_{ON}$ time is expressed by Formulas 3 and 4.

[Formula 3]

$$I_{peak} = 1/L \times (VIN - VO) \times T_{ON} \qquad 3$$

[Formula 4]

$$I_{peak} = 1/L \times (VIN - VO) \times T \times VO/VI \qquad 4$$

As for the ripple voltage in the light load mode, when load side transistor QN3 is off, and the energy accumulated in inductor L1 during the $T_{ON}$ time is denoted as PL, energy PL is expressed by Formula 5.

[Formula 5]

$$PL = \tfrac{1}{2} \times L \times I^2_{peak} \qquad 5$$

When this energy PL is moved to capacitor CO1, ripple voltage of capacitor CO1 is expressed by Formula 6.

[Formula 6]

$$PL = \tfrac{1}{2} \times L \times I^2_{peak} = \tfrac{1}{2} \times C \times V^2_{peak}$$

$$V_{peak} = I_{peak} \times \sqrt{(L/C)} \qquad (6)$$

From Formulas 3 and 4, the ripple voltage can be expressed by Formulas 7 and 8.

[Formula 7]

$$V_{peak} = 1/L \times (VIN-VO) \times T_{ON} \times \sqrt{(L/C)} \qquad (7)$$

[Formula 8]

$$V_{peak} = 1/L \times (VIN-VO) \times T \times VO/VIN \times \sqrt{(L/C)} \qquad (8)$$

As shown by Formulas 7 and 8, peak voltage $V_{peak}$ is affected by $T_{ON}$ time. In fact, when L=2.2 μH, input voltage V1=12V, output voltage=1V, C=22 μF, and $T_{ON}$=0.1 μs, peak voltage $V_{peak}$ becomes $V_{peak} = 1/L \times (VIN-VO) \times T_{ON} \times \sqrt{(L/C)} = 0.158V$ based on Formula 7, which is a fairly high ripple voltage.

SUMMARY OF THE INVENTION

A general object of the present invention is to present a buck converter and a switching regulator that suppresses a ripple voltage in order to solve the conventional problem.

A buck converter pertaining to an aspect of the present invention generates an output voltage that is lower than the input voltage. It has a first and a second MOS transistor that are connected in series between the input voltage and a first reference potential, an inductor that is connected to the connection node where the first and the second MOS transistors are connected, a switching control circuit that controls on time of at least the first MOS transistor, and a current detection circuit that detects a current that flows from the inductor to the first reference potential via the connection node and the second MOS transistor; wherein, the switching control circuit controls switching of the first MOS transistor so as to reduce the on time of the first MOS transistor when the current detection circuit detects a current.

The current detection circuit may include a first comparator that detects a current by comparing respective voltages that are applied from a first input connected to the connection node and a second input connected to a second reference potential, and the switching control circuit reduces the on time of the first MOS transistor based on the detection result of the first comparator. The current detection circuit may further include a counter that is connected to the first comparator, and the counter outputs a signal indicating the detection of the current to the switching control circuit when the detection result of the first comparator has reached a prescribed count. The switching control circuit may include a second comparator that decides the on time of the first MOS transistor by comparing respective voltages that are applied from a first node and a second node, a variable circuit that is connected to the first node and used to change the voltage of the first node, and a capacitor that is connected to the second node and capable of charging an electric charge from the connection node; whereby, the variable circuit reduces the voltage of the first node in response to the detection of a current by the current detection circuit, and the second comparator reduces the on time of the first MOS transistor. The variable circuit may include a third MOS transistor that is connected in series between the first node and a third reference potential, and the gate of the third MOS transistor is connected to the output of the current detection circuit. The first node may be a connection point where a first and a second resistor, which are connected in series between the output voltage connected to the inductor and the third reference potential, are connected; and the variable circuit includes a third resistor and the third MOS transistor that are connected in series between the first node and the third reference potential. Reduction of the on time of the first MOS transistor may be decided based on the amount of voltage drop at the first node; and the amount of the voltage drop is decided based on the first, the second, and the third resistors. The switching control circuit may include a circuit that turns the second MOS transistor off in response to the detection of a current by the current detection circuit.

The switching regulator pertaining to an aspect of the present invention includes the buck converter, an output capacitor that is connected to the inductor, and a feedback loop for the feedback of the output voltage connected to the inductor; and the switching control circuit controls the potential of the second node based on the output voltage fed back. The switching control circuit may include a third comparator that compares the feedback voltage generated based on the output voltage with a fourth reference potential and a transistor that controls charging/discharging of the capacitor connected to the second node.

Furthermore, the buck converter pertaining to the present invention may include a first transistor that is connected between a first power supply terminal and an input node, a second transistor that is connected between a second power supply terminal and the input node, an inductor element that is connected between the input node and an output node, and an output capacitor that is connected to the output node as well as a first comparison circuit that compares a first voltage corresponding to an output voltage with a first reference voltage and outputs a first signal corresponding to said comparison result, a time duration control circuit that outputs a second signal for controlling on time of the first transistor, a reverse current detection circuit that detects a reverse current flowing into the input node, a first logic circuit that outputs a first control signal for controlling conductance of the first transistor in response to the first signal and the second signal, a second logic circuit that outputs a second control signal for controlling conductance of the second transistor in response to the first control signal and the detection signal of the reverse current detection circuit, and a time duration adjustment circuit that outputs an adjustment signal for reducing the on time of the first transistor in response to the detection signal and the second control signal; whereby, the time duration control circuit outputs the second signal in response to the first control signal and controls output timing of the second signal so as to reduce the on time of the first transistor upon receiving the adjustment signal.

The time duration control circuit may include a second comparison circuit that compares a voltage signal that changes over time with a second reference voltage in response to the first control signal and outputs the second signal according to said comparison result, the reverse current detection circuit includes a third comparison circuit that compares the potential of the input node with a third reference voltage and outputs the detection signal according to said comparison result, and the time duration adjustment circuit includes an AND circuit that outputs a signal representing the logical product of the detection signal and the second control signal and a counter circuit that outputs the adjustment signal when the AND signal is input continuously N times. The time duration control circuit may include a first resistance dividing circuit that is connected to the output node and used to output a voltage divided from the voltage of said output node as the second reference voltage, a third transistor that is connected to the first resistance dividing circuit and used to change the second reference voltage in response to the adjustment signal, a first capacitor that supplies a charging voltage that changes over time as the voltage signal, and a fourth transistor that is connected parallel to the capacitor and used to let the capacitor discharge in response to the first control signal.

BRIEF DESCRIPTION OF THE DRAWINGS

Further aspects of the invention will ensue from the description herein below of preferred embodiments of the invention with reference to the accompanying drawings, wherein.

REFERENCE NUMERALS AND SYMBOLS AS SHOWN IN THE DRAWINGS

In the figures QN1, QN2, QN3, QN4 represent NMOS transistors, QP1 represents a PMOS transistor, N1-N10 represent nodes, SW represents a node, 100 represents a current detection circuit, 110 represents a variable circuit.

DESCRIPTION OF THE EMBODIMENTS

According to an aspect of the present invention, because the on time of the first MOS transistor is reduced when a current flowing from the connection node to the reference potential via the second MOS transistor is detected, a ripple voltage at the connection node can be suppressed.

Figure 1:
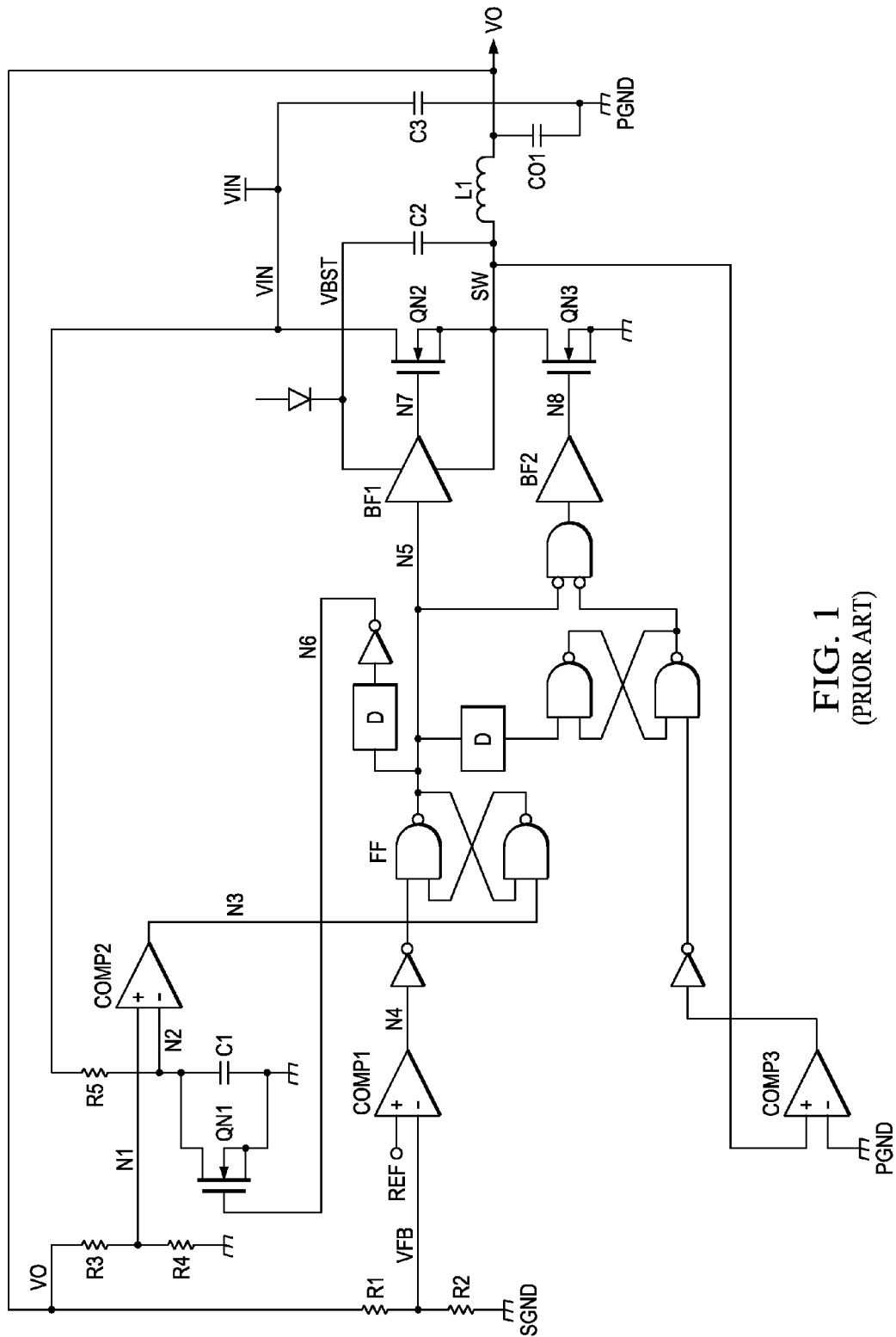
FIG. 1 is a circuit diagram of a switching regulator utilizing a conventional buck converter.
Figure 2:
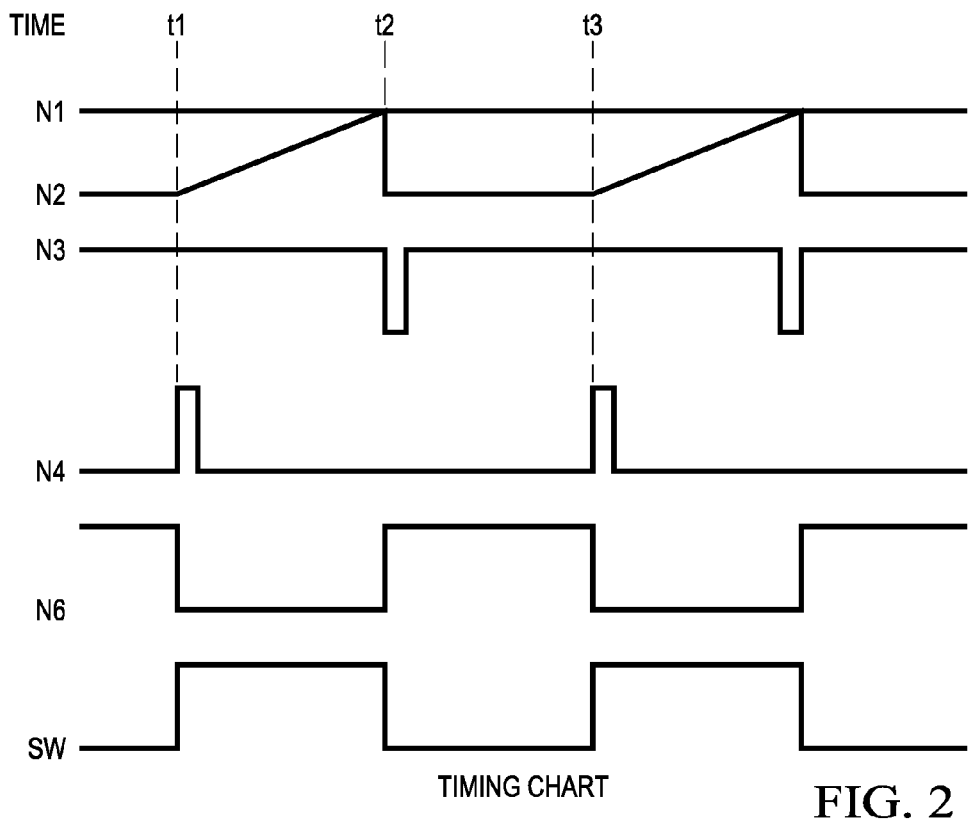
FIG. 2 is a timing chart for the circuit shown in FIG. 1.
Figure 3:
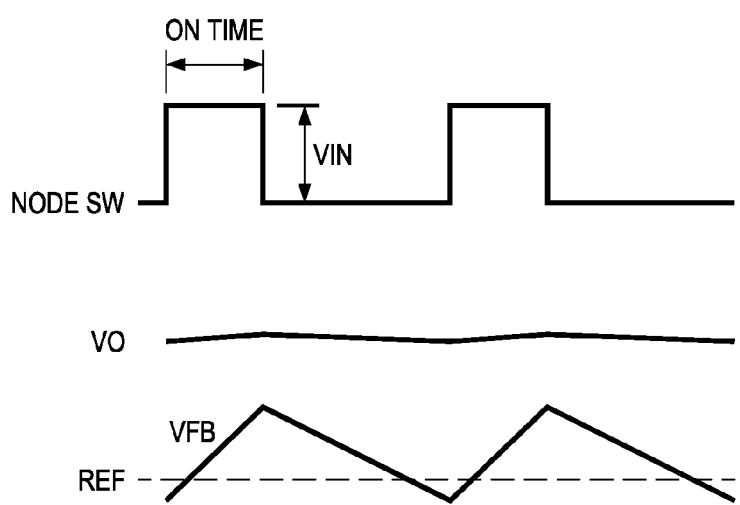
FIG. 3 is a diagram showing voltage waveforms of node SW and feedback voltage VFB of the circuit shown in FIG. 1.
Figure 4:
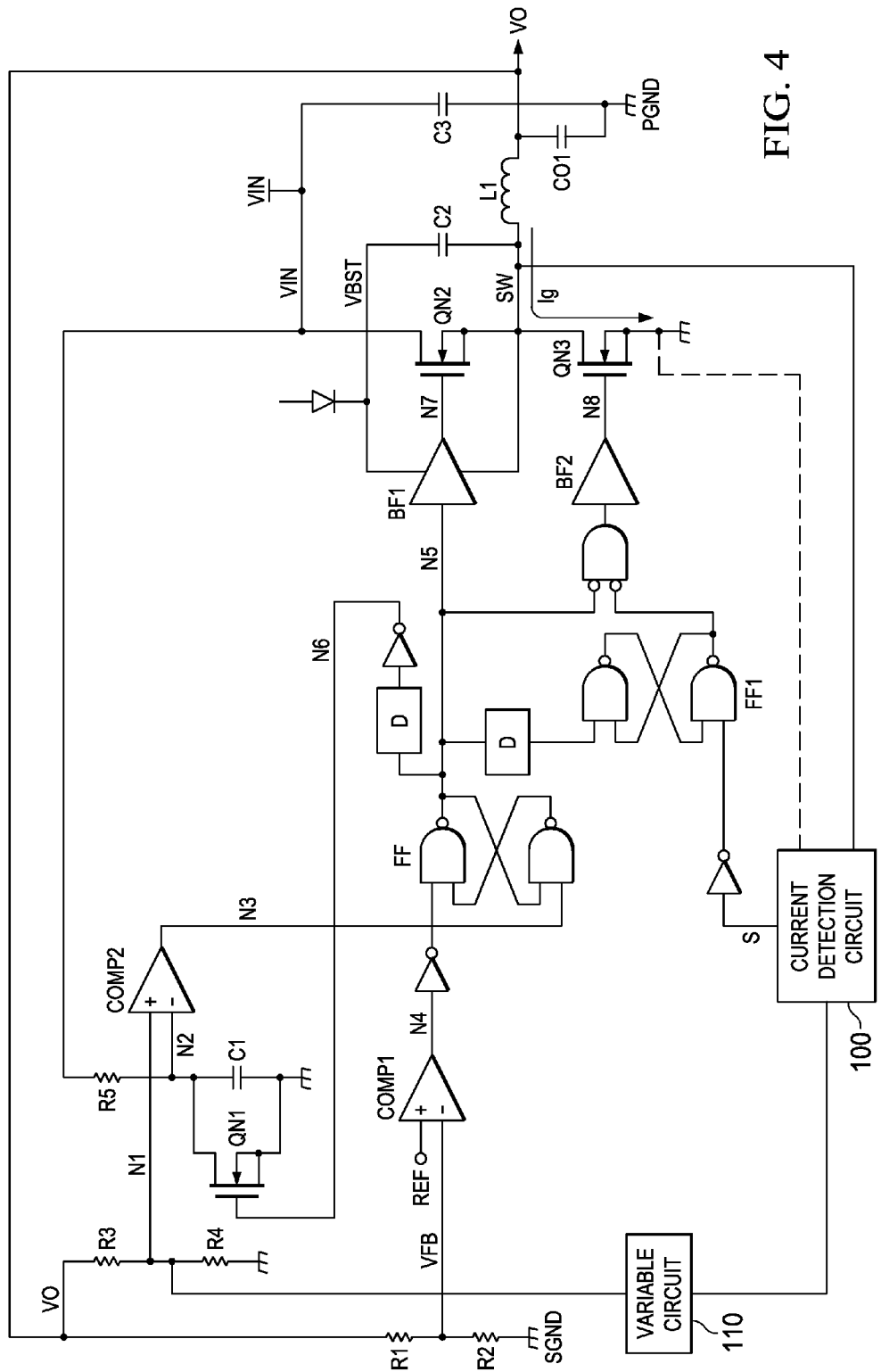
FIG. 4 is a circuit diagram of a switching regulator pertaining to a first embodiment of the present invention.

An embodiment of the present invention will be explained in detail below with reference to figures FIG. 4 is a circuit diagram of a switching regulator utilizing a buck converter pertaining to a first embodiment of the present invention. Here, the same portions of the configuration of the switching regulator in FIG. 1 are assigned with the same reference numbers. In a preferable embodiment, the switching regulator includes 2 NMOS transistors QN2 and QN3 that are connected in series between input voltage VIN and the ground potential, inductor L1 that is connected to node SW where transistor QN2 and transistor QN3 are connected, output capacitor CO1 that is connected to inductor L1, switching control circuit that includes $T_{ON}$ comparator COMP2 for controlling on time of transistor QN2, and current detection circuit 100 for detecting reverse current Ig that flows to the ground potential from inductor L1 via node SW and transistor QN3. The switching control circuit includes variable circuit 110 that changes the voltage at node N1 of $T_{ON}$ comparator COMP2 so as to reduce the on time of transistor QN2 as current detection circuit 100 detects reverse current Ig.

During a standby or when the load connected to the output is light, a reverse current is generated at inductor L1. Current detection circuit 100 detects reverse current Ig generated at inductor L1. Current detection circuit 100 is electrically connected to node SW or the source (indicated by a broken line in the figure) of transistor QN3 in order to detect reverse current Ig generated at inductor L1. Upon detecting reverse current Ig, current detection circuit 100 outputs a signal indicating the detection result to variable circuit 110. Variable circuit 110 is connected to node N1 and used to reduce potential of node N1 in response to the detection result of current detection circuit 100. As a result, the time it takes for potential of node N2 to reach the potential of node N1 is reduced, and $T_{ON}$ time of transistor QN2 gets reduced accordingly. As a result, as shown by Formula 7, a ripple voltage is suppressed.

A configuration may be adopted, whereby flip-flop circuit FF1 gets reset using signal S from current detection circuit 100 when reverse current Ig is detected by current detection circuit 100, and node N8 as the output of output buffer BF2 is brought to L level in order to turn NMOS transistor QN3 off. When transistor QN3 is turned off under a light load condition, the conversion efficiency can be further improved.

Figure 5:
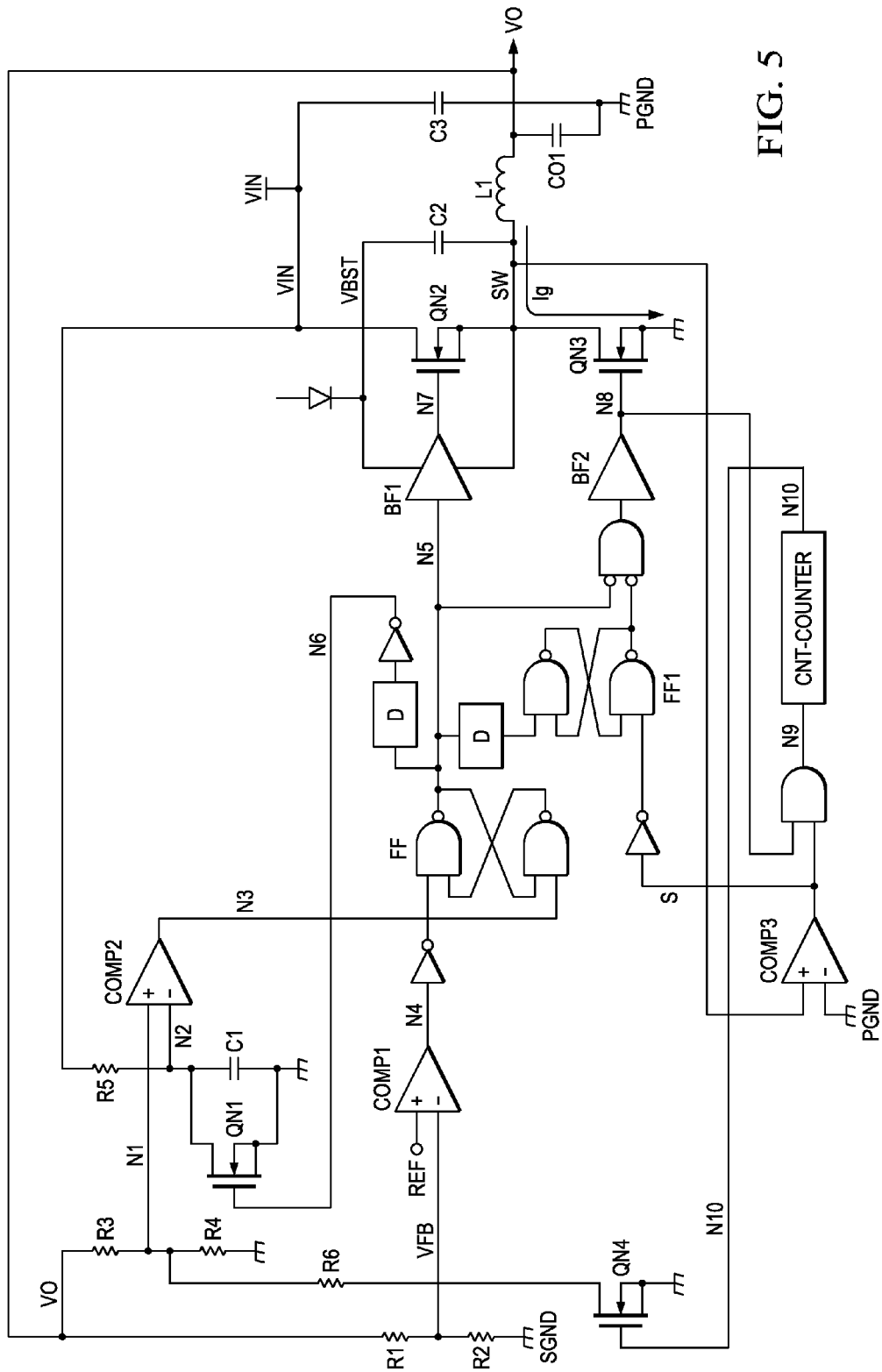
FIG. 5 is a circuit diagram of a switching regulator pertaining to a second embodiment of the present invention.

Next, a second embodiment of the present invention will be explained. The second embodiment includes circuit configurations for current detection circuit 100 and variable circuit 110 of the first embodiment. FIG. 5 is a circuit diagram of a switching regulator that utilizes a buck converter pertaining to the second embodiment; wherein, same components as those in FIG. 1 are assigned with the same reference numbers. In the second embodiment, current detection comparator COMP3, counter CNT, N-type transistor QN4, and resistor R6 are newly added.

Node SW is connected to the positive input terminal of current detection comparator COMP3, and a reference potential or ground potential PGND is connected to its negative input terminal. Output of current detection comparator COMP3 is connected to one of the inputs of the AND circuit, and potential of node N8, which is connected to the gate of L-side transistor QN3, is applied to the other input of the AND circuit. Node N9 as the output of the AND circuit is input to counter CNT, and node N10 as the output of counter CNT is connected to the gate of NMOS transistor QN4. Upon receiving an H-level pulse signal from current detection comparator COMP3 a prescribed number of times n, counter CNT outputs an H-level detection signal. Drain of transistor QN4 is connected to resistor R6, and its source is connected to the ground. Resistor R6 is connected to node N1.

Figure 6:
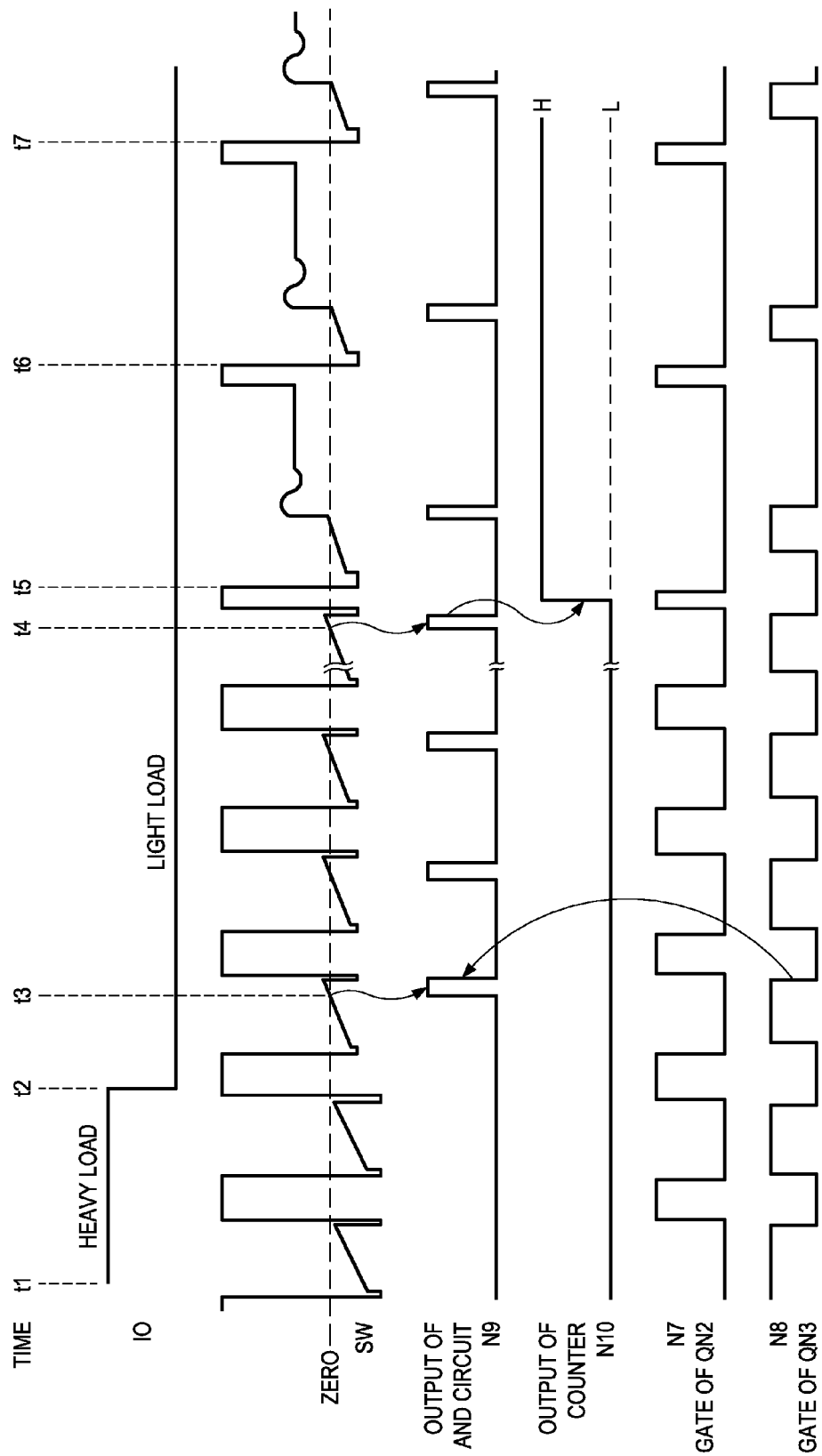
FIG. 6 is a timing chart for the switching regulator shown in FIG. 5.

Next, operation of the circuit of the second embodiment will be explained with reference to the timing chart shown in FIG. 6. A relatively heavy load is connected to output voltage VO, which is connected to inductor L1, during the period between time t1 and time t2. During said period, switching is performed so as to turn on and off transistor QN2 and transistor QN3 alternately, and the voltage supplied to inductor L1 is smoothed by output capacitor CO1 in order to generate desired output voltage VO.

When a relatively light load is connected to output voltage VO, which is connected to inductor L1, at time t2, reverse current Ig is generated at inductor L1. Said reverse current Ig flows to the ground when transistor QN3 is on. Therefore, when reverse current Ig flows in transistor QN3, the potential of node SW becomes a positive voltage due to the on resistance of transistor QN3. Said potential of node SW is supplied to the positive input terminal of current detection comparator COMP3. When transistor QN3 is on, and the voltage of node SW becomes positive as indicated by time t3, the potential of node SW exceeds zero (ground potential). As a result, the output of current detection comparator COMP3 is inverted, and an H-level signal is output. In addition, output signal S of comparator COMP3 is input to flip-flop circuit FF1 via the inverter; whereby, node N8 of output buffer BF2 reaches L level, and transistor QN3 is turned off. As a result, the output of the AND circuit reaches L level, a pulse signal with a prescribed pulse width is generated at node N9 as the output of said [AND circuit], and said pulse signal is input to counter CNT.

Counter CNT counts the pulse signals generated by the AND circuit; whereby, when the pulse signals are input continuously in a quantity in excess of prescribed number of times n as indicated by time t4, it inverts the output and outputs an H-level detection signal. When node N10 as the output of counter CNT reaches H level, transistor QN4 is turned on, and the potential of node N1 drops. As a result, threshold value (potential of node N1) of $T_{ON}$ comparator COMP2 drops; whereby, as indicated by time t5, $T_{ON}$ time of transistor QN2 is reduced, and the potential of node SW drops. Subsequently, as reverse current Ig is detected continuously, the output of counter CNT is kept at H level, and the on time of transistor Q2 is reduced as indicated by times t6 and t7. When the detection of reverse current Ig ceases as a heavy load gets connected to output voltage VO, the output of counter CNT is inverted to L level, transistor QN4 is turned off, and the voltage of node N1 increases to the original voltage that corresponds to output voltage VO.

When the voltage of node N1 is denoted as VN1, VN1=VO×(R6//R4/(R3+R6//R4)), and this voltage drops when transistor QN4 is turned on. When the on time of the conventional switching regulator, or the on time when transistor QN4 is not turned on, is denoted as $T_{ON1}$, and the on time of the circuit of the present embodiment is denoted as $T_{ON2}$, $T_{ON1}$ and $T_{ON2}$ times are proportional to the voltage of node N1. When the voltages of node N1 at $T_{ON}$ and $T_{ON2}$ times are denoted as VTON1 and VTON2, their relationship can be expressed by Formulas 9 and 10.

[Formula 9]

$$VTON1 = V0 \times (R4/(R3+R4)). \quad (9)$$
$$VTON2 = V0 \times (R4 // R6 / (R3 + R4 // R6))$$

$$VTON2/VTON1 = (V0 \times (R4 // R6 / (R3 + R4 // R6)))/$$
$$(V0 \times (R4/(R3+R4)))$$
$$= (R4 // R6 / (R3 + R4 // R6))/$$
$$(R4/(R3+R4))$$
$$= (R4 // R6 \times (R3 + R4)) / ((R3 + R4 / R6) \times R4)$$
$$= a \quad (10)$$

From Formulas 8, 9, and 10, output ripple voltage can be expressed by Formula 11.

[Formula 10]

$$V_{peak}=1/L \times (VIN-VO) \times T_{ON} \times a \times \sqrt{(L/C)} \quad (11)$$

In fact, when L=2.2 μH, VIN=12V, VO=1V, C=22 μF, and $T_{ON}$=0.1 μs, the conventional ripple voltage is 0.158V; whereas, in the present application, when R3=R6=R4 for the sake of simplicity, the ripple voltage can be reduced significantly, that is, 0.105V, as shown below.

[Formula 11]

$$a = 2/3$$
$$V_{peak} = 1/L \times (VIN-VO) \times T_{ON} \times a \times \sqrt{(L/C)}$$
$$= 0.158V \times a$$
$$= 0.105V$$

According to the switching regulator of the present embodiment, the following effects can be achieved.

(1) Counter CNT is operated using reverse current Ig of inductor L1 so as to reduce the $T_{ON}$ time of transistor QN2 easily, so the output ripple voltage can be suppressed under light load conditions and during a standby.

(2) Operational stability can be maintained through continuous monitoring of occurrences of reverse current Ig using counter CNT.

(3) Because the capacity of output capacitor CO1 can be reduced by reducing the ripple voltage, cost of the power supply system can be reduced.

Figure 7:
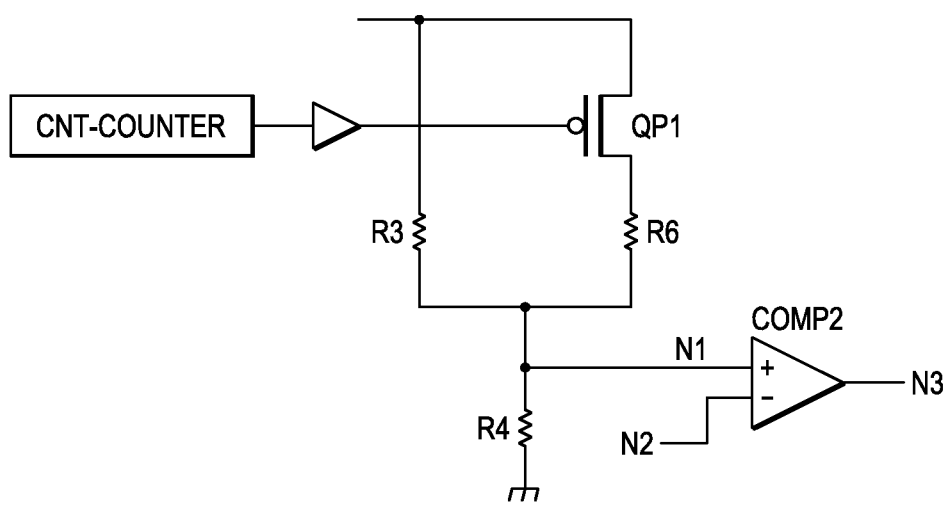
FIG. 7 is a diagram showing another circuit configuration of the switching regulator shown in FIG. 5.

Next, another modification example of a second embodiment will be shown in FIG. 7. In this modification example, P-type MOS transistor QP1 and resistor R6, which is connected to said transistor in series, are connected parallel to resistor R3 in order to vary the voltage at node N1 of comparator COMP2. Detection signal from counter CNT is connected to the gate of transistor QP1 via a buffer. Therefore, when an H-level detection signal is output from counter CNT, transistor QP1 is turned on, the voltage of node N1 drops, and the on time of transistor QN2 is reduced.

Although the switching regulators of the embodiments shown in FIGS. 4 and 5 were configured such that node N2 was connected to input voltage VIN via resistor R5, node N2 may be electrically connected to node SW via transistor QN2. When so done, characteristics can be improved.

In addition, although specific examples of the ripple voltage when resistors R3=R4=R6 were shown in the embodiments, the values of resistors R3, R4, and R6 can be selected arbitrarily as long as the relationship a<1 is maintained. Furthermore, although counter CNT was designed to output the detection signal when it counted a prescribed number of times n in order to achieve operational stability in the embodiments, counter CNT is not necessarily mandatory, and the potential of node N1 may be reduced in response to the output of current detection comparator COMP3. Furthermore, a bipolar transistor may be used as the transistor connected to node N2 of $T_{ON}$ comparator COMP2.

Although the present invention has been described in detail, it should be understood that various changes, substitutions and alterations can be made thereto without departing from the spirit and scope of the invention as defined by the appended claims.

The invention claimed is:

1. A buck converter for generating an output voltage lower than the input voltage comprising:
   an inductor connected to a connection node where a first and a second MOS transistor are connected;
   a switching control circuit that controls on time of at least the first MOS transistor; and
   a current detection circuit that detects a current flowing from the inductor to a first reference potential via the connection node and the second MOS transistor whereby the switching control circuit controls switching of the first MOS transistor independently of control of the second transistor so as to reduce the on time of the first MOS transistor in response to the detection of a current by the current detection circuit, wherein the on time is reduced to less than being in proportion to the output voltage/the input voltage so that ripple in the output voltage of the buck converter is reduced at light load.

2. The buck converter described in claim 1, wherein the current detection circuit includes a first comparator that detects a current by comparing voltages that are applied from a first input connected to the connection node and a second input connected to a second reference potential; and wherein the switching control circuit reduces the on time of the first MOS transistor based on the detection result of the first comparator.

3. The buck converter described in claim 2, wherein the current detection circuit further includes a counter that is connected to the first comparator, and the counter outputs a signal indicating the detection of a current to the switching control circuit when the detection result of the first comparator has reached a prescribed count.

4. The buck converter described in claim 1, wherein the switching control circuit includes a second comparator that decides the on time of the first MOS transistor by comparing respective voltages applied from a first node and a second node, a variable circuit that is connected to the first node and used to change the voltage of the first node, and a capacitor that is connected to the second node and capable of charging an electric charge from the connection node whereby the variable circuit reduces the voltage of the first node, and the second comparator reduces the on time of the first MOS transistor in response to the detection of a current by the current detection circuit.

5. The buck converter described in claim 4, wherein the variable circuit includes a third MOS transistor that is connected in series between the first node and a third reference potential, and wherein the gate of the third MOS transistor is connected to the output of the current detection circuit.

6. The buck converter described in claim 4, wherein the first node is a connection point where a first and a second resistor, which are connected in series between the output voltage connected to the inductor and a third reference potential, are connected; and the variable circuit includes a third resistor and the third MOS transistor that are connected in series between the first node and the third reference potential.

7. The buck converter described in claim 6, wherein reduction of the on time of the first MOS transistor is defined based on the amount the voltage of the first node is reduced, and the amount of voltage drop is defined by the first, the second, and the third resistors.

8. The buck converter described in claim 1, wherein the switching control circuit includes a circuit that turns the second MOS transistor off in response to the detection of a current by the current detection circuit.

9. A switching regulator that includes the buck converter described in claim 1 wherein:
an output is connected to the inductor; and
a feedback loop that is used for feedback of an output voltage connected to the inductor whereby the switching control circuit controls the potential of the second node based on the output voltage fed back.

10. The switching regulator described in claim 9, wherein the switching control circuit includes a third comparator that compares the feedback voltage generated based on the output voltage with a fourth reference potential and a transistor that controls a voltage on the first transistor based on the comparison result of the third comparator.

11. A buck converter comprising:
a first transistor connected between a first power supply terminal and an input node;
a second transistor connected between a second power supply terminal and the input node;
an inductor connected between the input node and an output node;
an output capacitor connected to the output node;
a first comparison circuit that compares a first voltage corresponding to an output voltage with a first reference voltage and outputs a first signal corresponding to said comparison result;

a time duration control circuit that outputs a second signal for controlling on time of the first transistor;
a reverse current detection circuit that detects a reverse current flowing into the input node;
a first logic circuit that outputs a first control signal for controlling conduction of the first transistor in response to the first signal and the second signal;
a second logic circuit that outputs a second control signal for controlling conduction of the second transistor in response to the first control signal and the detection signal of the reverse current detection circuit, and
a time duration adjustment circuit that outputs an adjustment signal for reducing the on time of the first transistor independently of control of the second transistor in response to a detection signal and the first control signal whereby the time duration control circuit outputs the second signal in response to the first control signal and controls output timing of the second signal so as to reduce the on time of the first transistor independently of control of the second transistor upon receiving the adjustment signal, wherein the on time is reduced to less than being in proportion to the output voltage/the input voltage so that ripple in the output voltage of the buck converter is reduced at light load.

12. A buck converter comprising:
a first transistor connected between a first power supply terminal and an input node;
a second transistor connected between a second power supply terminal and the input node;
an inductor connected between the input node and an output node;
an output capacitor connected to the output node;
a first comparison circuit that compares a first voltage corresponding to an output voltage with a first reference voltage and outputs a first signal corresponding to said comparison result;
a time duration control circuit that outputs a second signal for controlling on time of the first transistor;
a reverse current detection circuit that detects a reverse current flowing into the input node;
a first logic circuit that outputs a first control signal for controlling conduction of the first transistor in response to the first signal and the second signal;
a second logic circuit that outputs a second control signal for controlling conduction of the second transistor in response to the first control signal and the detection signal of the reverse current detection circuit, and
a time duration adjustment circuit that outputs an adjustment signal for reducing the on time of the first transistor in response to a detection signal and the first control signal whereby the time duration control circuit outputs the second signal in response to the first control signal and controls output timing of the second signal so as to reduce the on time of the first transistor independently of control of the second transistor upon receiving the adjustment signal,
wherein the time duration control circuit includes a second comparison circuit that compares a voltage signal that changes over time in response to the first control signal with a second reference voltage and outputs the second signal according to said comparison result;
the reverse current detection circuit includes a third comparison circuit that compares the potential of the input node with a third reference voltage and outputs the detection signal according to said comparison result, and the time duration adjustment circuit includes an AND circuit that outputs a signal representing the logical product of the detection signal and the second control signal and a counter circuit that outputs the adjustment signal when the AND signal is input continuously N times.

13. The buck converter described in claim 12, wherein the time duration control circuit includes a first resistance dividing circuit that is connected to the output node and used to output a voltage divided from the voltage of the output node as the second reference voltage, a third transistor that is connected to the first resistance dividing circuit and used to change the second reference voltage in response to the adjustment signal, a first capacitor that supplies a charging voltage that changes over time as the voltage signal, and a fourth transistor that is connected parallel to the capacitor and used to let the capacitor discharge in response to the first control signal.

14. The buck converter described in claim 5, wherein the first node is a connection point where a first and a second resistor, which are connected in series between the output voltage connected to the inductor and a third reference potential, are connected; and the variable circuit includes a third resistor and the third MOS transistor that are connected in series between the first node and the third reference potential.

15. The buck converter described in claim 2, wherein the switching control circuit includes a circuit that turns the second MOS transistor off in response to the detection of a current by the current detection circuit.

16. The buck converter described in claim 3, wherein the switching control circuit includes a circuit that turns the second MOS transistor off in response to the detection of a current by the current detection circuit.

17. The buck converter described in claim 4, wherein the switching control circuit includes a circuit that turns the second MOS transistor off in response to the detection of a current by the current detection circuit.

18. The buck converter described in claim 5, wherein the switching control circuit includes a circuit that turns the second MOS transistor off in response to the detection of a current by the current detection circuit.

19. The buck converter described in claim 6, wherein the switching control circuit includes a circuit that turns the second MOS transistor off in response to the detection of a current by the current detection circuit.

20. The buck converter described in claim 7, wherein the switching control circuit includes a circuit that turns the second MOS transistor off in response to the detection of a current by the current detection circuit.

* * * * *